(12) United States Patent
Popescu-Stanesti et al.

(10) Patent No.: US 7,126,241 B2
(45) Date of Patent: Oct. 24, 2006

(54) INTELLIGENT ADAPTER

(75) Inventors: Vlad Popescu-Stanesti, San Jose, CA (US); Constantin Bucur, Santa Clara, CA (US)

(73) Assignee: O2Micro International Limited, Grand Cayman (KY)

( * ) Notice: Subject to any disclaimer, the term of this patent is extended or adjusted under 35 U.S.C. 154(b) by 761 days.

(21) Appl. No.: 10/055,810

(22) Filed: Jan. 23, 2002

(65) Prior Publication Data

US 2003/0025401 A1 Feb. 6, 2003

Related U.S. Application Data

(60) Provisional application No. 60/309,459, filed on Aug. 1, 2001.

(51) Int. Cl.
*H02J 1/10* (2006.01)

(52) U.S. Cl. .................................................. 307/29

(58) Field of Classification Search ................ 307/149, 307/29
See application file for complete search history.

(56) References Cited

U.S. PATENT DOCUMENTS

| | | | |
|---|---|---|---|
| 5,184,059 A * | 2/1993 | Patino et al. ................ 320/125 |
| 5,818,197 A * | 10/1998 | Miller et al. ................. 320/107 |
| 6,058,034 A * | 5/2000 | Cummings et al. ........... 363/74 |
| 6,246,215 B1 | 6/2001 | Popescu-Stanesti ......... 320/139 |
| 6,329,796 B1 | 12/2001 | Popescu ...................... 320/134 |
| 6,452,364 B1 * | 9/2002 | Saeki et al. ................. 320/137 |
| 2004/0145348 A1 * | 7/2004 | Bucur |

* cited by examiner

*Primary Examiner*—Robert L. Deberadinis
(74) *Attorney, Agent, or Firm*—Grossman, Tucker, Perreault & Pfleger, PLLC

(57) ABSTRACT

In one aspect the present invention provides an AC/DC or DC/DC adapter, comprising circuitry to generate a signal proportional to the maximum adapter current. In another aspect, the present invention provides a portable electronic device, comprising circuitry to receive a signal proportional to the maximum current supplied to the portable electronic device and a charger controller. Still another aspect of the present invention provides an adapter topology system, comprising an AC/DC or DC/DC adapter comprising circuitry to generate a signal proportional to the maximum adapter current; and a portable electronic device adapted to receive power from said adapter and to receive said signal proportional to the maximum adapter current.

19 Claims, 4 Drawing Sheets

INTELLIGENT ADAPTER

The present invention claims benefit under 35 USC § 119(e) of U.S. provisional application Ser. No. 60/309,459, filed Aug. 1, 2001, and assigned to the same assignee.

BACKGROUND OF THE INVENTION

1. Field of the Invention

The present invention relates to adapter topologies, and more particularly, to adapter topologies that generate information related to available or maximum adapter current and to electronic devices configured to receive this information. Particular utility for the present invention is in portable electronic devices, however, the present invention is equally applicable to any device that uses an adapter to derive power.

2. Description of Related Art

Most portable electronic devices (e.g., portable computers, cell phones, PDAs, etc.) in use today utilize an AC/DC or DC/DC adapter that can be plugged into a wall outlet or cigarette lighter, etc., used to power the device, and possibly charge the batteries simultaneously. A typical adapter simply supplies power, and provides no information to the charger circuit as to the maximum available power that can be delivered by the adapter. To control the power delivered to the batteries (for charging) and to the device, a charger circuit is provided which regulates the flow of current from the adapter. An example of charger topologies are provided in U.S. Pat. Nos. 6,246,215 and 6,329,796; and U.S. patent application Ser. No. 09/948,828, titled "Voltage Mode High Accuracy Battery Charger", all assigned to O2Micro International Limited, and incorporated by reference herein in their entirety. Such charger topologies dynamically allocate available adapter current between the batteries and the device.

FIG. 1 depicts a conventional topology that includes an adapter 1 and mobile equipment 2. The terms "mobile equipment" or "portable electronic device" as used herein mean a portable computer, cell phone, PDA, and/or any other device that uses an adapter to derive power. The adapter 1 generates a signal 90 indicative of the type of adapter used. This signal only has two states, and is used as an identification (ID) signal that represents the type of adapter used. The adapter 1 of FIG. 1 can be of two types: a high power adapter (e.g., 70W) or a low power adapter (e.g., 45W). The high power type of adapter generates no signal 90, while the low power adapter generates a signal 90 having a predetermined value. The mobile equipment is adapted with a switch 4, whose conduction state determines the type of adapter (low power or high power) present. Assuming that high power adapter is present, switch 4 is OFF. If a low power adapter is present, signal 90 turns switch 4 ON. Signal 90 is a signal representing the type of adapter present (low or high), and may be used by power management processors or charger circuits. Note that this topology only has two states representing the presence of a low power adapter or high power adapter, and thus cannot generate information related to the maximum or available power provided by the adapter. Note also that this topology requires that the adapter and mobile equipment be matched, such that the adapter could not be used with other mobile equipment and vice-versa.

Thus, there exists a need to provide an adapter topology that provides information related to maximum adapter current, which may be utilized by a charger to accurately allocate available current to batteries (for charging) and a device (for operation). There also exists a need for an adapter topology that permits the adapter to be used with a wide range of devices so that the adapter is can be used with many types of mobile equipment devices.

SUMMARY OF THE INVENTION

Accordingly, in one aspect the present invention provides an AC/DC or DC/DC adapter, comprising circuitry to generate a signal proportional to the maximum adapter current.

In another aspect, the present invention provides a portable electronic device, comprising circuitry to receive a signal proportional to the maximum current supplied to said portable electronic device and a charger controller.

Still another aspect of the present invention provides an adapter topology system, comprising an AC/DC or DC/DC adapter comprising circuitry to generate a signal proportional to the maximum adapter current; and a portable electronic device adapted to receive power from said adapter and to receive said signal proportional to the maximum adapter current.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF THE EXEMPLARY EMBODIMENTS

As a broad overview, the adapter topology system embodiments of FIGS. 2–7 generate an identification signal (ID) proportional to the maximum or available adapter current. Also, the topologies disclose electronic device configured to receive the signal proportional to the maximum or available adapter current. The system comprises both the adapter and the portable device, but the present invention is also directed to the adapter and the portable device independent of each other. A battery charger controller, associated with the portable electronic device (and such as provided in the aforementioned U.S. Patents) may be adapted to utilize this signal to dynamically allocate power between the batteries (for charging) and the mobile equipment (for operating power). Such battery charger controllers generally operate to give the mobile equipment power, and will use any remaining current to charge the batteries. The present invention is not limited to a particular charger controller, and a charge controller is not necessary for an understanding of the present invention.

Figure 1:
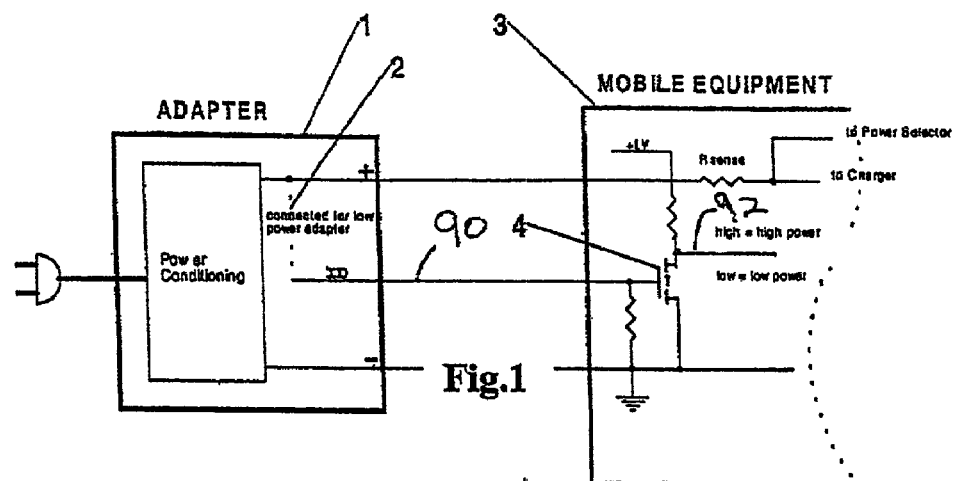
FIG. 1 depicts a conventional adapter topology.
Figure 2:
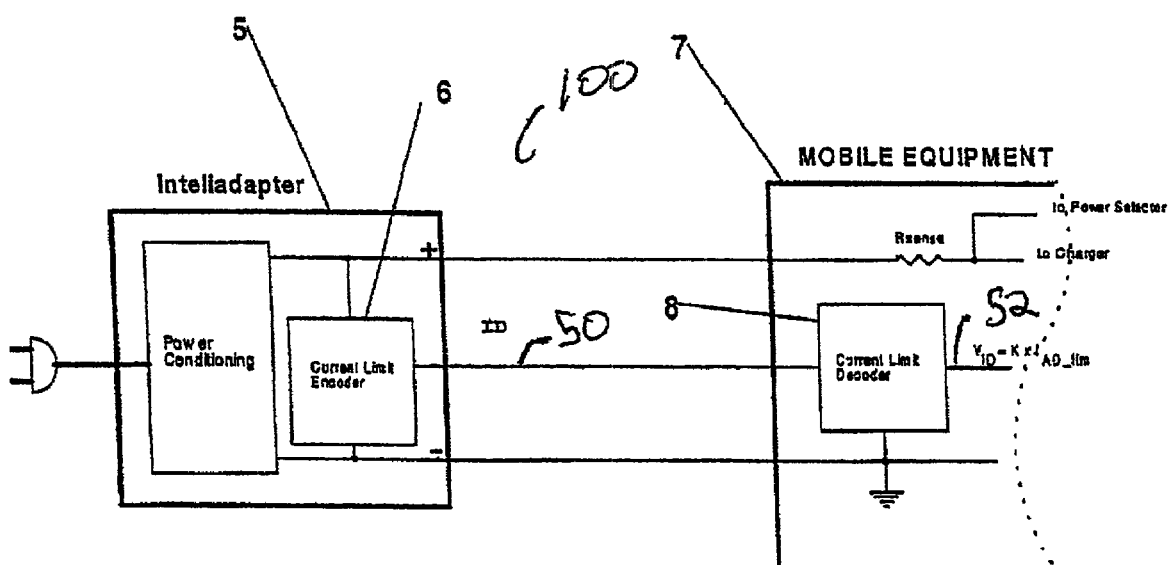
FIG. 2 depicts one exemplary adapter topology system of the present invention.

FIG. 2 depicts one exemplary adapter topology system 100 of the present invention. In this embodiment, the adapter 5 includes an embedded current limit encoder 6 that generates a signal 50 indicative of the maximum current provided by the adapter 5. The encoder 6 may comprise, for example, serial code generating circuitry, current-to-frequency coding circuitry and/or other coding circuitry known in the art. Of course, the adapter supplies power to the device 7 (via the +/− power lines), as well as signal 50. The mobile equipment 7 is adapted with current limit decoding circuitry 8 that decodes signal 50. The decoding circuitry 8 is appropriately matched to the coding circuitry 6 to code and decode signal 50. The decoding circuitry 8 generates a voltage signal 16 ($V_{ID}$) that is proportional to the adapter current limit $I_{AD\_lim}$, i.e., $V_{ID} = k \times I_{AD\_lim}$. Note that in this exemplary embodiment, the voltage signal 16 can represent changes in the adapter current. In other words, signal 16 changes with changes in the adapter current limit. In this example, signal 16 changes linearly, however the present invention equally contemplates a nonlinear relationship between the maximum adapter current signal and signal 16. Signal 16 is sent to a charger circuit (or other power management device) that can adjust power delivered to both batteries and the device based on the value of signal 16.

Figure 3:
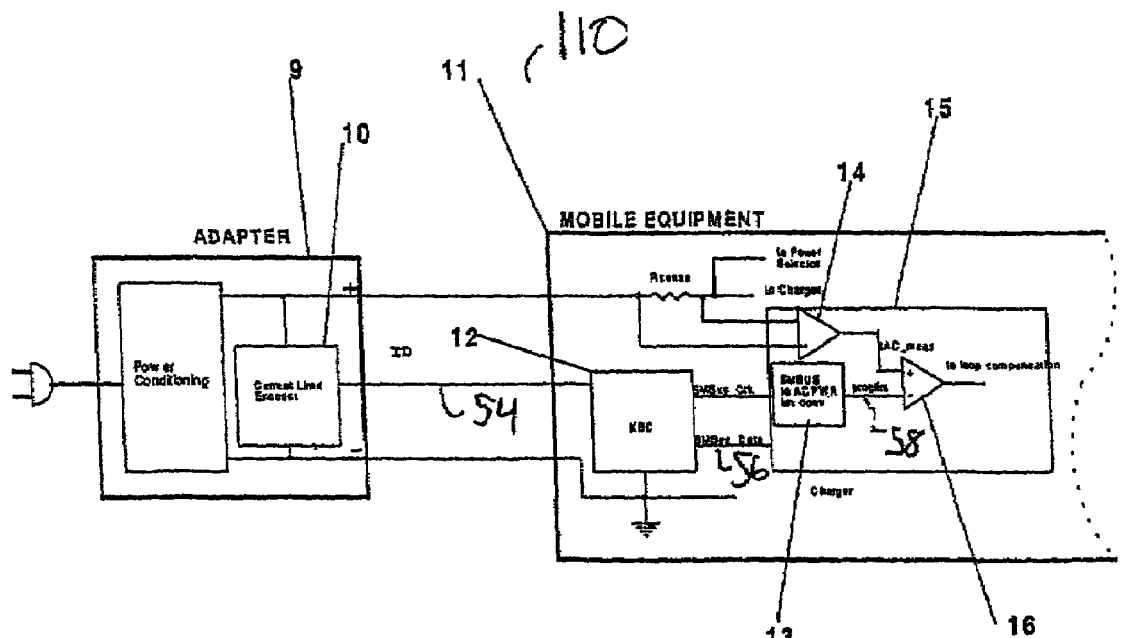
FIG. 3 depicts another exemplary adapter topology system of the present invention.

FIG. 3 depicts another exemplary adapter topology system 110 of the present invention. In this exemplary embodiment, the adapter 9 includes a current sense encoder 10 that generates a digital coded signal 54 indicative of the maximum current limit of the adapter 9. The coded signal 54 is sent (via a conventional and/or proprietary digital channel) to a keyboard controller 12 (or any other type of microcontroller) associated with the mobile device. The keyboard controller 12 is a conventional device found in portable computers, and may be appropriately adapted to generate an SMBus serial communications signal 56 (designated as SMBus_Clk and SMBus_Data 56 in the Figure). Signal 56 is an SMBus digital signal representing the maximum current limit of the adapter 9.

The charger circuit 15 is of the type that can be externally programmed with a signal indicative of the maximum current limit. Charger 15 includes an SMBus converter 13 that essentially comprises a DAC circuit to convert digital signal 56 into an analog signal 58. A sense comparator 14 generates a signal indicative of the total current delivered by the adapter (across sense resistor Rsense) and generates a measured adapter current value Imeas. Imeas and signal 58 are compared in comparator 16 that generates a signal indicative of the difference between the maximum available adapter current (signal 58) and the measured current supplied by the adapter. This value is used by other components in the charger (not shown and not necessary for an understanding of the present invention, but fully disclosed in the aforementioned patents) to dynamically allocate power delivered to the batteries and the mobile equipment.

Figure 4:
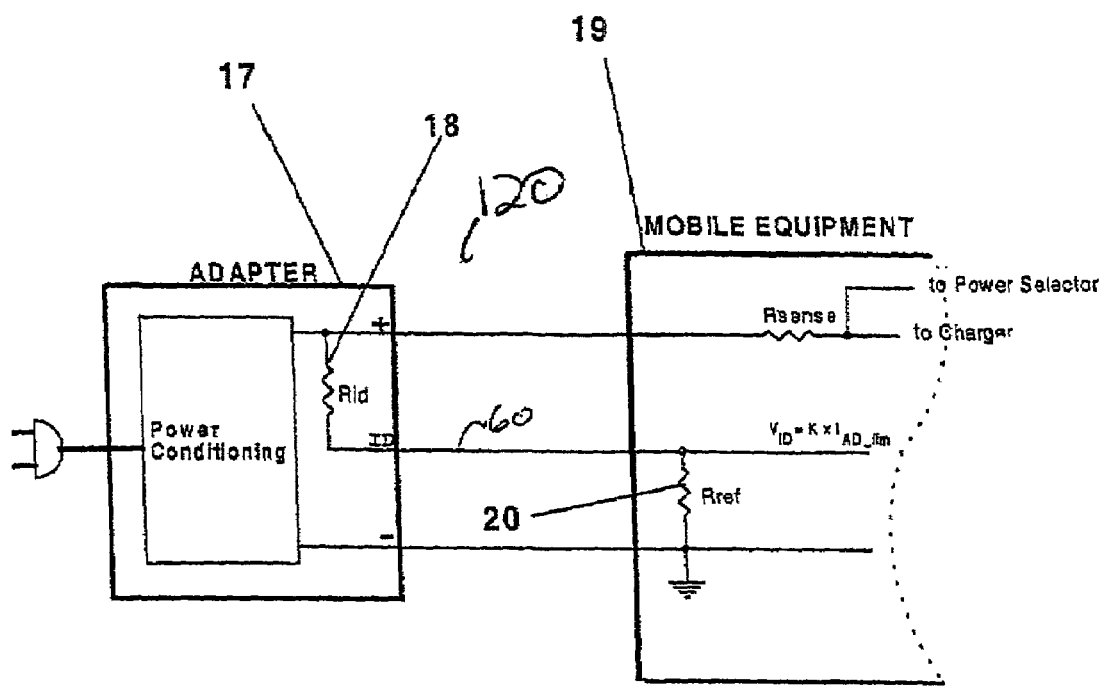
FIG. 4 depicts another exemplary adapter topology system of the present invention.

FIG. 4 depicts another exemplary adapter topology system 120 of the present invention. In this embodiment, the adapter 17 includes an embedded identification resistor $R_{ID}$ 18 that is connected in series with the adapter voltage (+) and the mobile device. $R_{ID}$ is fixed for a given adapter, and generates a fixed voltage drop. The mobile equipment 19 includes a reference resistor $R_{ref}$ 20 connected to the identification resistor and to ground (−). $R_{ID}$ and $R_{ref}$, taken together, comprise a voltage divider, and it follows that $V_{ID}$ is based on $R_{ID}$, $R_{ref}$, and the adapter voltage. The adapter voltage, $V_{ID}$, across the reference resistor represents the adapter current capability, with a scale factor as a function of the value of the sense resistor Rsense, Rref and the charger current gain (k). If portability of the adapter 17 is desirable, this scale factor may be standardized by providing a standardized value for Rref. As with the previous embodiments, $V_{ID}$ may be utilized by the charger circuitry to dynamically allocate power available from the adapter 17 based on the known value of the maximum or available power available.

Figure 5:
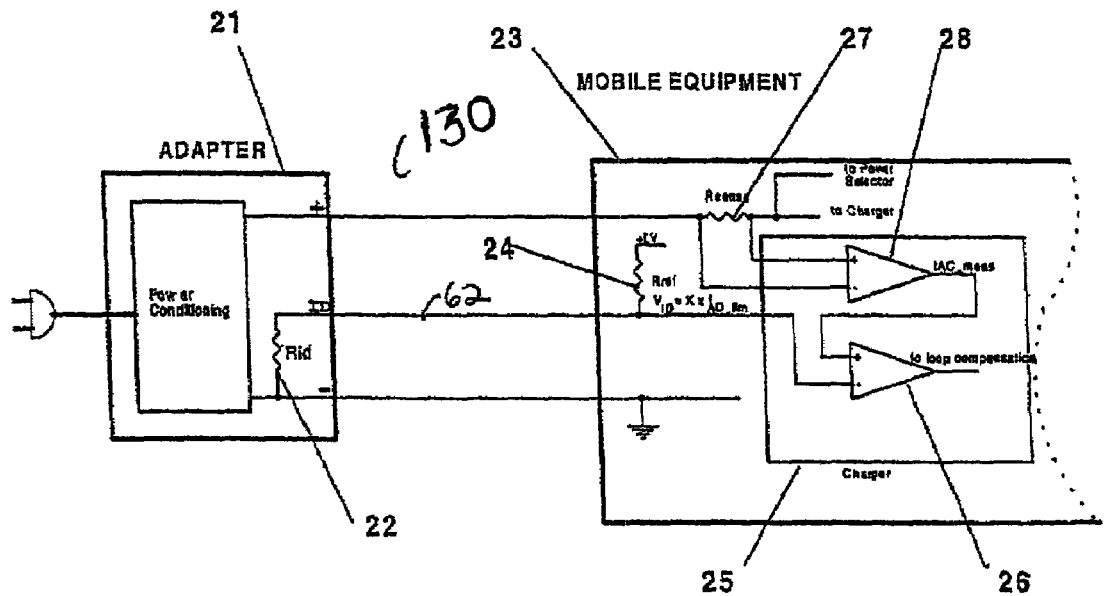
FIG. 5 depicts another exemplary adapter topology system of the present invention.

FIG. 5 depicts another exemplary adapter topology system 130 of the present invention. Topology 130 is similar to topology 120 of FIG. 4, except the identification voltage, $V_{ID}$, is independent of the adapter voltage. This embodiment also depicts some details of the charger circuitry 25 (although not necessary for an understanding of the present invention). In this embodiment, the adapter 21 includes an embedded identification resistor $R_{ID}$ connected to the adapter ground and to the mobile equipment 23 (via, for example, the power cord (+/−) of the adapter). The mobile equipment includes an embedded pull-up resistor Rref 24 that is coupled between signal line 62 and a regulated low voltage source LV (e.g., 5V, 3.3V, etc.), thus forming a voltage divider defined by $R_{ID}$ and Rref. Identification signal 62, then, is a proportional voltage signal $V_{ID} = k \times I_{AD\_lim}$ indicative of the maximum or available adapter current; where $I_{AD\_lim}$ is the adapter current limit and k is a proportionality constant. Note that $V_{ID}$ depends only on $R_{ID}$ and Rref, and is independent of the adapter voltage.

FIG. 5 also provides more detailed structure of an exemplary charger controller 25. The charger 25 includes a current sense amplifier 28 and an error amplifier 26. The current sense amplifier generates a signal ($I_{AC\_meas}$) indicative of the actual adapter current generated across the current sense resistor Rsense 27. Error amplifier compares $I_{AC\_meas}$ with $V_{ID}$ (the voltage signal representing the maximum available adapter current) to generate a control signal used by the power regulating feedback loop of the charger controller 25. Again, the details of the charger controller are not necessary for an understanding of the present invention, and are being provided herein only as an example of how one skilled in the art may utilize the maximum current signal. Accordingly, the present invention is not limited to the exemplary charger controller circuitry described herein.

Figure 6:
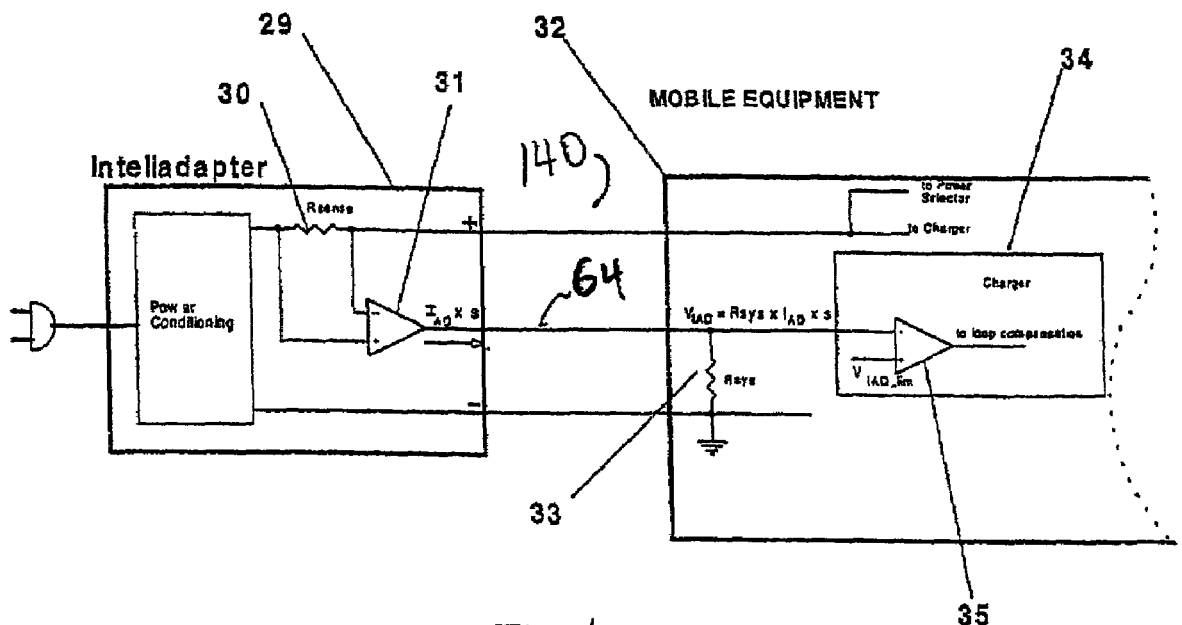
FIG. 6 depicts another exemplary adapter topology system of the present invention.

FIG. 6 depicts another exemplary adapter topology system 140. This embodiment generates a normalized adapter current signal. This embodiment also depicts some elements of the charger controller circuit. In this embodiment, the adapter 29 includes an embedded current sense resistor (Rsense) 30 and a current sense amplifier 31. These components might typically be associated with a charger controller. The amplifier 31 provides a normalized current signal 64 that is proportional to the adapter current ($I_{AD} \times s$). The gain of the amplifier 31 is selected to provide a standardized output when the adapter reaches its maximum current level. In other words, amplifier 31 has a set upper gain. The normalized current signal 64 is a value indicative of a percentage of maximum current.

The mobile equipment 32 in this embodiment includes an embedded resistor 33 Rsys coupled between the normalized current signal 64 and ground. Embedding Rsys in this manner eliminates error generated by the parasitic voltage drop of the adapter. The voltage drop across Rsys is indicative of the percentage of maximum current of the adapter, and is expressed as $V_{IAD} = Rsys \times I_{AD} \times s$. More precisely, the voltage $V_{IAD}$ represents the actual adapter current as a percentage of the rated adapter current. Error amplifier compares this value to a value indicative of 100% of the adapter current ($V_{IAD\_lim}$) and generates a control signal used by the power regulation feedback loop of the charger controller.

Figure 7:
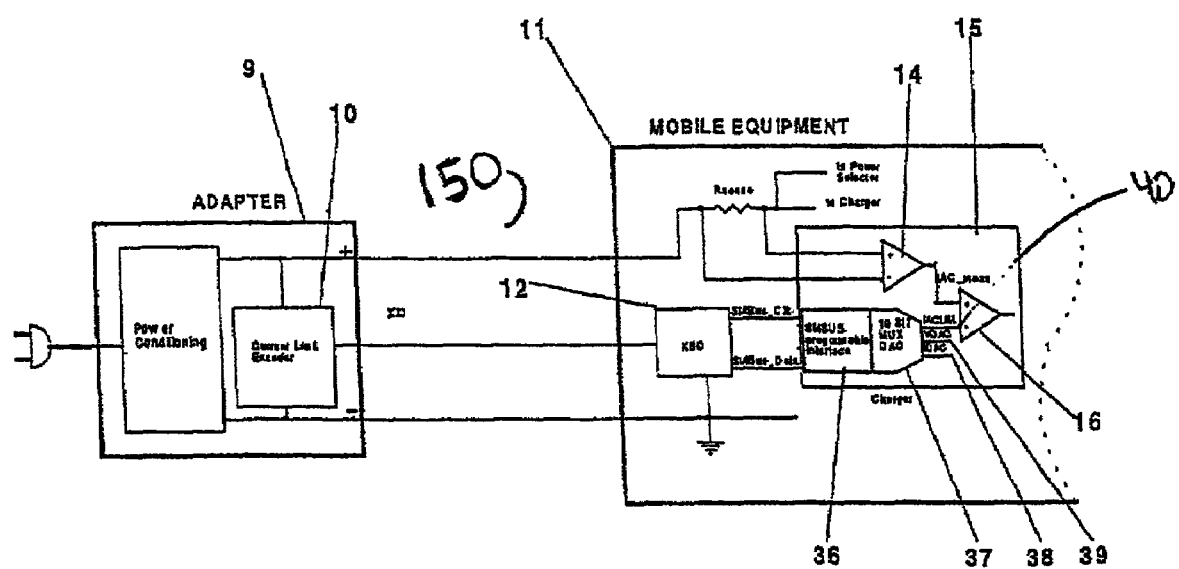
FIG. 7 depicts another exemplary adapter topology system of the present invention.

FIG. 7 depicts yet another exemplary adapter topology system 150. This embodiment is similar to the topology of FIG. 3, except that the DAC 13 is replaced with an SMBus programmable interface 36 and a multiplexed DAC 37. The DAC 37 receives the output of the SMBus interface 36 and generates a plurality of programmable analog signals used by the charger controller 15, as will be understood in the art. Examples of such programmable signals include the charging current reference IDAC 38, the charging voltage reference VDAC 39 and the adapter current limit IACLIM.

The current limit encoder 10 embedded in the adapter 9 sends data representing the adapter maximum current to the keyboard controller (KBC) 12 (or any other microcontroller) in the mobile equipment 11. The KBC 12 issues appropriate SMBus commands representing the adapter current limit, the battery charging voltage IDAC and the battery charging current VDAC to the charger 15 via SMBus communication protocols. The charger 15 uses the SMBus programmable interface 36 to decode the SMBus commands. The decoded values are sent to the multiplexed DAC 37, one by one, and are converted to analog signals on the different outputs 38, 39 and 40. The signals (voltages) are used as reference signals for error amplifiers within the charger, such as error amplifier 16 depicted.

In all of the embodiments described herein the identification signal generated by the adapter represents a dynamic indication of the maximum available power for the particular adapter, and can change linearly with changes in available adapter current (power). Although the drawings generally depict a separate signal line between the adapter and the mobile equipment, those skilled in the art will recognize that numerous other communication methodologies could be employed to communicate information between the adapter and the mobile equipment. For example, the embodiments of FIGS. 2, 3 and 7 may be adapted to include wireless communication (e.g., RF, IR, etc) between the adapter and the mobile equipment to communicate maximum or available adapter current information from the adapter to the mobile equipment. Likewise, FIG. 6 could be similarly modified and further modified with a programmable current source (not shown) embedded in the mobile equipment. This programmable current source could be coupled to Rsys and programmed to generate the proportional adapter current value ($I_{AD}$×s). Alternatively, such information could be communicated over the existing power lines (+ and/or −) using modulation/demodulation techniques known in the art to communicate available power data over the existing power lines.

Further modifications will become apparent to those skilled in the art, and all such modifications are deemed within the spirit and scope of the present invention as defined by the appended claims.

The invention claimed is:

1. An AC/DC or DC/DC adapter for providing DC power via at least one power line to a portable electronic device, said adapter comprising circuitry capable of generating an identification signal proportional to a maximum adapter current available from said adapter, said circuitry is further capable of changing said identification signal in response to changes in available adapter current.

2. An AC/DC or DC/DC adapter as claimed in claim 1, said circuitry comprising a current limit encoder generating said identification signal.

3. An AC/DC or DC/DC adapter as claimed in claim 1, said circuitry comprising an identification resistor coupled to a positive adapter voltage.

4. An AC/DC or DC/DC adapter as claimed in claim 1, said circuitry comprising an identification resistor coupled to a negative adapter voltage.

5. An AC/DC or DC/DC adapter as claimed in claim 1, said circuitry comprising a current sense resistor coupled to a positive adapter voltage and a current sense comparator coupled to said current sense resistor, said current sense comparator having a set upper gain and generating a normalized value of said identification signal.

6. A system, oomprising; an AC/DC or DC/DC adapter comprising circuitry capable of generating an identification signal proportional to a maximum adapter current available from said adapter, said circuitry is further capable of changing said identification signal in response to changes in available adapter current; and a portable electronic device adapted to receive power from said adapter via at least one power line and to receive said identification signal from said adapter.

7. The system as claimed in claim 6, said circuitry comprising a current limit encoder generating said identification signal; said portable electronic device comprising a current limit decoder receiving said identification signal and generating a voltage proportional to said maximum adapter current.

8. The system as claimed in claim 7, said current limit decoder comprising a keyboard controller, said keyboard controller generating SMBus commands to a digital to analog circuit to generate said voltage proportional to said maximum adapter current.

9. The system as claimed in claim 6, said circuitry comprising an identification resistor coupled to a positive adapter voltage; said portable electronic device comprising a reference resistor coupled between said identification resistor and ground thereby farming a voltage divider generating a voltage proportional to said maximum adapter current.

10. The system as claimed in claim 6, said circuitry comprising an identification resistor coupled to a negative adapter voltage; said portable electronic device comprising a reference resistor coupled between said identification resistor and a reference voltage thereby forming a voltage divider generating a voltage proportional to said maximum adapter current.

11. The system as claimed in claim 6, said circuitry comprising a current sense resistor coupled to a positive adapter voltage and a current sense comparator coupled to said current sense resistor, said current sense comparator having a set upper gain and generating a normalized value of said identification signal; said portable electronic device comprising a resistor coupled between said identification signal and ground thereby generating a voltage representing a percentage that an actual current is with respect to the maximum adapter current.

12. The system as claimed in claim 6, said current limit decoder comprising a keyboard controller, said keyboard controller generating SMBus commands to a multiplexed digital to analog converter through an SMBus programmable interface, said multiplexed digital to analog converter generating an analog signal proportional to the maximum adapter current.

13. A portable electronic device, comprising circuitry coupled to an AC/DC or DC/DC adapter, said circuitry is configured to receive an identification signal proportional to a maximum adapter current supplied to said portable electronic device a said circuitry is further configured to generate a voltage signal proportional to said identification signal, said circuitry is further configured to change said voltage signal in response to changes in available current provided by said AC/DC or DC/DC adapter.

14. A portable electronic device as claimed in claim 13, said circuitry comprising a current limit decoder receiving a coded signal indicative of said identification signal and generating the voltage proportional to said maximum adapter current of said AC/DC or DC/DC adapter supplying power to said portable electronic device.

15. A portable electronic device as claimed in claim 14, said current limit decoder comprising a keyboard controller, said keyboard controller generating SMBus commands to a digital to analog circuit to generate said voltage proportional to said maximum adapter current.

16. A portable electronic device as claimed in claim 13, said circuitry comprising a reference resistor coupled between said identification signal and ground generating a the voltage proportional to said maximum adapter current of said AC/DC or DC/DC adapter supplying power to said portable electronic device.

17. A portable electronic device as claimed in claim 13, said circuitry comprising a reference resistor coupled between said identification signal and a reference voltage, and generating a voltage proportional to said maximum adapter current of said AC/DC or DC/DC adapter supplying power to said portable electronic device.

18. A portable electronic device as claimed in claim 13, said identification signal comprising a normalized signal; said circuitry comprising a resistor coupled between said normalized signal and ground thereby generating a voltage representing a percentage that an actual current supplied to said portable electronic device is with respect to the maximum adapter current.

19. A portable electronic device as claimed in claim 14, said current limit decoder comprising a keyboard controller, said keyboard controller generating SMBus commands to a multiplexed digital to analog converter through an SMBus programmable interface, said multiplexed digital to analog converter generating an analog signal proportional to the maximum current supplied to said portable electronic device.

* * * * *

UNITED STATES PATENT AND TRADEMARK OFFICE
CERTIFICATE OF CORRECTION

PATENT NO. : 7,126,241 B2 Page 1 of 1
APPLICATION NO. : 10/055810
DATED : October 24, 2006
INVENTOR(S) : Popescu-Stanesti et al.

It is certified that error appears in the above-identified patent and that said Letters Patent is hereby corrected as shown below:

On the title page, item (73), in "Assignee" in column 1, line 2, delete "Grand Cayman (KY)" and insert -- Grand Pavillion Commercial Centre West Bay Road, PO Box 32331 SMB, Georgetown Grand Cayman, Cayman Islands, BWI --, therefor.

In column 6, line 16, in Claim 6, delete "oomprising;" and insert -- comprising: --, therefor.

In column 6, line 40, in Claim 9, delete "farming" and insert -- forming --, therefor.

In column 7, line 1, in Claim 13, after "comprising" insert -- : --.

In column 7, line 5, in Claim 13, delete "a" before "said".

In column 7, line 23, in Claim 16, after "generating" delete "a".

In column 8, line 4, in Claim 17, delete "a" and insert -- the --, therefor.

In column 8, line 11, in Claim 18, delete "a" and insert -- the --, therefor.

Signed and Sealed this

First Day of July, 2008

JON W. DUDAS
*Director of the United States Patent and Trademark Office*